United States Patent
Baran et al.

(10) Patent No.: US 10,577,082 B2
(45) Date of Patent: Mar. 3, 2020

(54) COCKPIT CONTROL OF A FIXED WING AIRCRAFT

(71) Applicant: Sikorsky Aircraft Corporation, Stratford, CT (US)

(72) Inventors: Michael Paul Baran, Prospect, CT (US); Nicholas Charles Visinski, Fairfield, CT (US); Igor Cherepinsky, Sandy Hook, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 335 days.

(21) Appl. No.: 15/599,735

(22) Filed: May 19, 2017

(65) Prior Publication Data
US 2018/0043994 A1   Feb. 15, 2018

Related U.S. Application Data

(60) Provisional application No. 62/374,519, filed on Aug. 12, 2016.

(51) Int. Cl.
*B64C 13/18* (2006.01)
*G01C 23/00* (2006.01)

(52) U.S. Cl.
CPC .............. *B64C 13/18* (2013.01); *G01C 23/00* (2013.01)

(58) Field of Classification Search
CPC ...................................................... B64C 13/18
USPC ........................................................ 244/175
See application file for complete search history.

(56) References Cited

U.S. PATENT DOCUMENTS

| 3,888,201 | A  | * | 6/1975  | Zuvela ................... | B63C 9/0011 114/144 R |
| 5,240,207 | A  | * | 8/1993  | Eiband .................. | G05D 1/0038 244/190 |
| 6,948,681 | B2 | * | 9/2005  | Stupakis ................. | B64C 39/02 244/117 R |
| 7,970,502 | B2 | * | 6/2011  | Boorman ............... | G01C 23/00 244/175 |
| 8,052,096 | B2 |   | 11/2011 | Cerchie et al. | |
| 9,284,996 | B2 | * | 3/2016  | Kruk ....................... | F16D 27/14 |
| 2006/0058928 | A1 | * | 3/2006 | Beard .................. | G01C 23/005 701/11 |

(Continued)

FOREIGN PATENT DOCUMENTS

| CA | 2965494 A1 | * | 6/2016 | ............. B64C 13/18 |
| EP | 3251946 A1 | * | 12/2017 | ............. B64C 13/04 |

(Continued)

OTHER PUBLICATIONS

Markoff, John; The New York Times, A Machine in the Co-Pilot's Seat, Jul. 20, 2015, https://ww.nytimes.com/2015/07/21/science/robot-co-pilot-darpa-alias.html?_r=0, pp. 1-4.

*Primary Examiner* — Christopher P Ellis
(74) *Attorney, Agent, or Firm* — Cantor Colburn LLP

(57) ABSTRACT

A device and method for flying an aircraft is disclosed. A housing that is removably installable in a cockpit of the aircraft is installed in the cockpit. The housing includes a processor. The processor receives a flight measurement from the aircraft, determines a flight control parameter for flying the aircraft from the flight measurement, and operates a flight control device of the aircraft to implement the flight control parameter to fly the aircraft.

15 Claims, 3 Drawing Sheets

(56) References Cited

U.S. PATENT DOCUMENTS

2014/0297067 A1* 10/2014 Malay .................. G01C 9/005
                                                        701/4
2015/0329199 A1* 11/2015 Golborne ............... B64C 27/04
                                                        244/196
2017/0355467 A1* 12/2017 Rudolph ................ B64C 13/18
2018/0275651 A1*  9/2018 Prosser ................ G08G 5/0021
2018/0304994 A1* 10/2018 Gauvain ............. G05D 1/0808

FOREIGN PATENT DOCUMENTS

| EP | 3403924 A1 * | 11/2018 | ............. B64C 13/18 |
| JP | H08295294 A | 11/1996 | |
| JP | 2006193034 A | 7/2006 | |
| WO | WO-2013120031 A1 * | 8/2013 | ............. B64C 27/56 |

* cited by examiner

COCKPIT CONTROL OF A FIXED WING AIRCRAFT

CROSS-REFERENCE TO RELATED APPLICATIONS

This application takes priority from U.S. Provisional Application Ser. No. 62/374,519, filed on Aug. 12, 2016, which is incorporated herein in its entirety by reference.

STATEMENT OF FEDERAL SUPPORT

This invention was made with government support with the United States Government under DARPA Contract No.: HR0011-15-9-004. The government therefore has certain rights in this invention.

BACKGROUND OF THE INVENTION

The present invention is directed to a device for flying an aircraft and, in particular, to a flight control device that can be removably installed in a cockpit of the aircraft in order to fly the aircraft throughout a full flight envelope without pilot intervention.

Aircraft autopilot systems are employed to take over flight operations from a pilot while an aircraft is airborne. Autopilot systems generally are installed in an aircraft during manufacture of the aircraft and are designed and programmed to work within the specifications of the particular aircraft into which the autopilot system has been installed. The majority of these autopilot systems have a low bandwidth of operations, providing only the ability to control flight operations while airborne but not during take-off or landing. For legacy aircraft that do not have autopilot systems installed, the costs for upgrading the aircraft by installing an autopilot system can be prohibitive. There is a need for an autopilot system that can be installed in a variety of aircraft in order to fly the aircraft with or without a human pilot on board.

SUMMARY OF THE INVENTION

According to one embodiment of the present invention, a device for flying an aircraft, includes: a housing that is removably installable in a cockpit of the aircraft; a processor supported by the housing, the processor configured to: receive a flight measurement from the aircraft, determine a flight control parameter for flying the aircraft from the flight measurement, and operate a flight control device of the aircraft to implement the flight control parameter to fly the aircraft.

According to another embodiment of the present invention, a method of flying an aircraft, comprising: installing a removable housing in a cockpit of the aircraft, wherein the housing includes a processor; and operating the processor to: receive a flight measurement of the aircraft, determine a flight control parameter for flying the aircraft from the measurement, and implement the flight control parameter at the aircraft to fly the aircraft.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
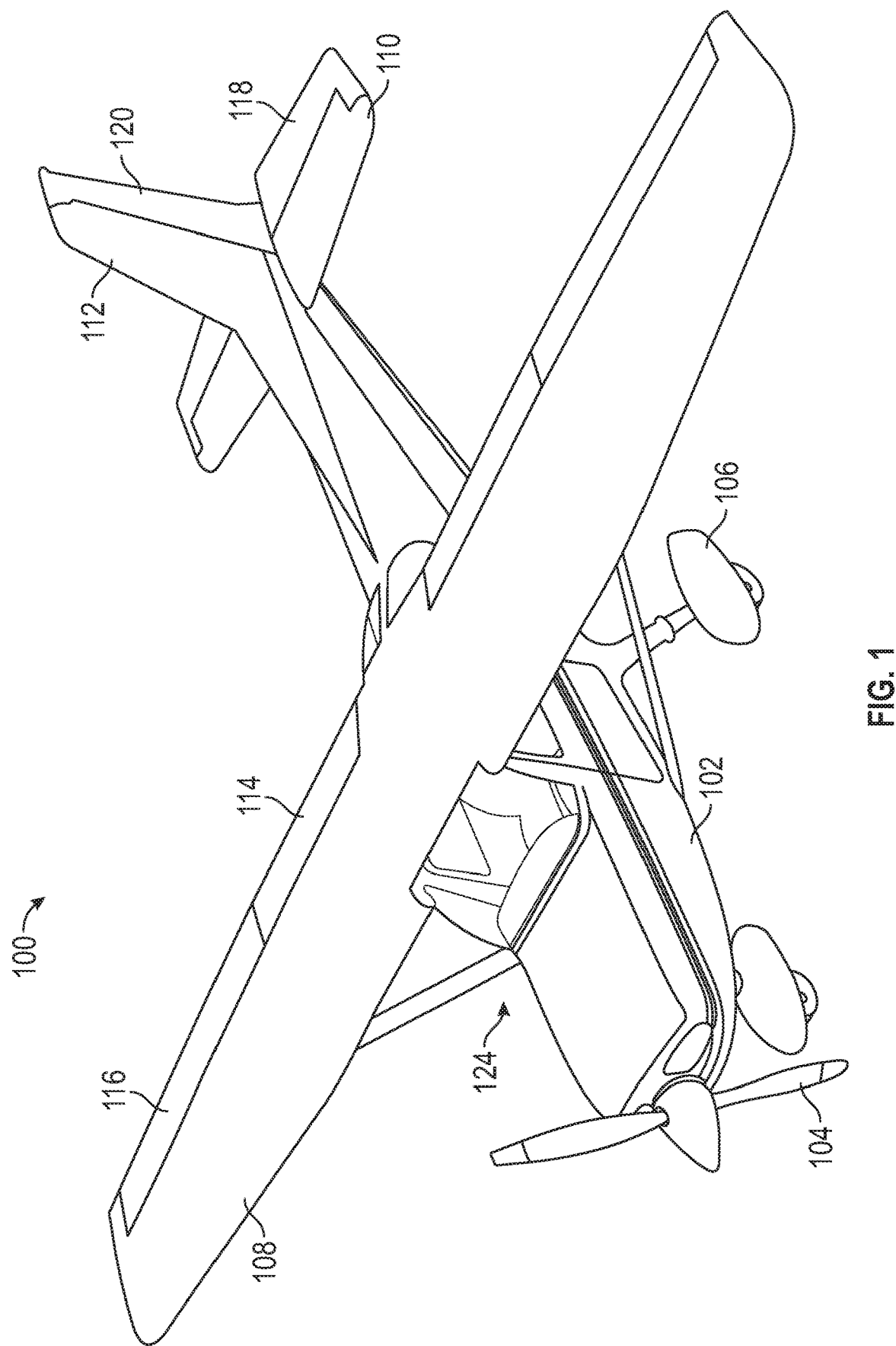
FIG. 1 schematically illustrates an example of an aircraft 100 that can be flown using the flight control device disclosed herein.

Referring now to the Figures, where the invention will be described with reference to specific embodiments, without limiting same, FIG. 1 schematically illustrates an example of an aircraft 100 that can be flown using the flight control device disclosed herein. The aircraft 100 is a fixed wing aircraft that includes a fuselage 102, propeller 104 and landing gear 106. The aircraft 100 further includes wing 108 near a front of the aircraft 100 and horizontal stabilizer 110 and vertical stabilizer 112 at a rear of the aircraft 100. The wing 108 includes flaps 114 and ailerons 116 that can be moved up and down with respect to the wing 108 in order to control flight of the aircraft 100. The horizontal stabilizer 110 includes elevators 118 that can be moved up and down to control a pitch of the aircraft 100. The vertical stabilizer 112 includes a rudder 120 that controls a yaw of the aircraft 100. The aircraft 100 includes a cockpit 124 that includes room or seats for at least a pilot and a co-pilot. In various embodiments, cockpit 124 also includes seats for passengers. Various flight controls in the cockpit 124 are operated to move the parts of the aircraft 100 such as the flaps 114, ailerons 116, elevators 118 and rudder 120, for example, to control the aircraft 100. The aircraft 100 may also include a set of sensors that obtain flight data with regard to the aircraft 100, such as altitude, flight speed, etc. This flight data can be displayed to a pilot of the aircraft 100 at an instrument panel in order to aid the pilot in flying the aircraft 100.

Although a particular aircraft configuration is illustrated and described in the disclosed embodiment, other configurations aircrafts and vehicles, such as multi-engine fixed wing aircraft, vertical take-off and landing (VTOL) rotary wing aircraft, high speed compound rotary wing aircrafts with supplemental translational thrust systems, dual contra-rotating, coaxial rotor system aircrafts, tilt-rotors and tilt-wing aircrafts, may also benefit from embodiments of the disclosure.

Figure 2:
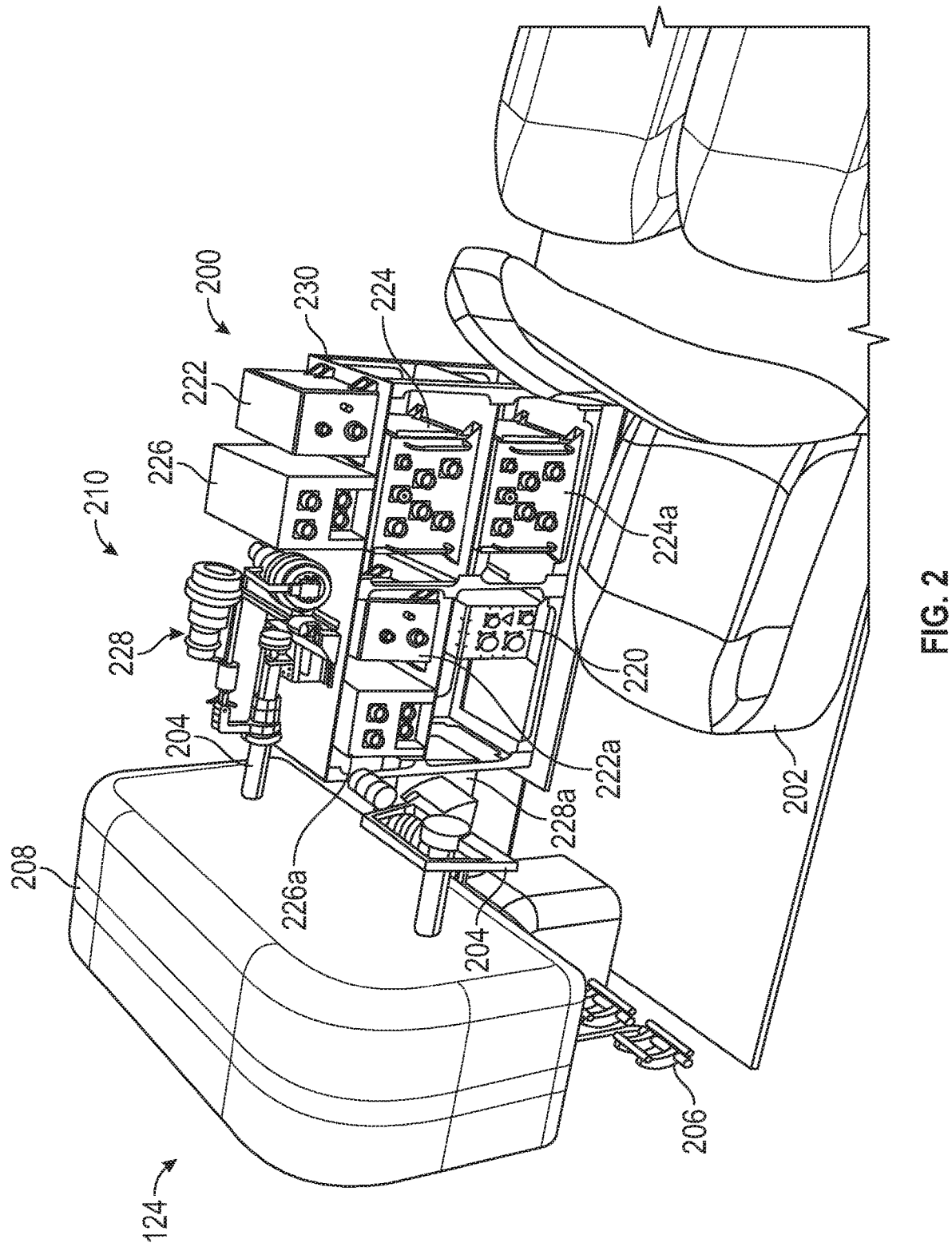
FIG. 2 shows a side view of the cockpit of the aircraft of FIG. 1 including an automatic flight control device installed for automatic control and flight of the aircraft in one embodiment of the present invention.

FIG. 2 shows a side view of the cockpit 124 of the aircraft 100 of FIG. 1 including a separately installable automatic flight control device 200 for automatic control and flight of the aircraft 100 in one embodiment of the present invention. The cockpit 124 includes a pilot's seat 202 and pilot's flight control devices such as yoke 204 for control of the pitch and/or roll of aircraft 100 and pedals 206 for control of the yaw of aircraft 100. Yoke 204 and pedals 206 are also provided on the co-pilot's side of the aircraft 100. An instrument panel 208 provides flight data that is read by the pilot or co-pilot during flight in order to aid the pilot in flying the aircraft 100. A seat for the co-pilot has been removed and the automatic flight control device 200 has been installed at a co-pilot location 210 within the cockpit 124 and next to the pilot's seat 202. The automatic flight control device 200 includes a high performance computer 220, a first Embedded Global Positioning Satellite and Inertial Navigation System (EGI) 222, a first vehicle management computer (VMC) 224 and a first actuator control unit 226. The automatic flight control device 200 also includes a second EGI 222a, a second VMC 224a and a second actuator control unit 226a. In one embodiment, first EGI 222, first VMC 224 and first actuator control unit 226 are used to control flight control devices (e.g., yoke 204 and pedals 206). Second EGI 222a, second VMC 224a and second actuator control unit 226a can also control these flight control devices and are provided for redundancy and/or backup. In addition, a triple or quadruple redundancy can be used in alternate embodiments. For illustrative purposes only, the actions of flying the aircraft is discussed herein only with respect to high performance computer 220, first EGI 222, first VMC 224 and first actuator control unit 226. However it is to be understood that such discussion applies equally to second EGI 222a, second VMC 224a and second actuator control unit 226a.

The high performance computer 220 includes programs for computing flight plans, including obstacle avoidance and other features. The high performance computer 220 can be connected to a LIDAR (light detecting and ranging) system that obtains a terrain of the landscape over which the aircraft 100 is flying. The first EGI 222 includes an Inertial Navigation System for obtaining an inertial rate data of the aircraft as well as Global Positioning Satellite (GPS) system for obtaining location measurements for the aircraft 100. The VMC 224 is a flight control computer that contains primary flight control laws for the aircraft and executes fault detection and contingency plans. The VMC 224 receives flight plan data from the high performance computer 220 and inertial rate and location data from the EGI 222. The VMC 224 may also be connected to the flight instrument panel 208 via a wire or bus of wires and receives flight data from the flight instrument panel 208 over the wire or bus or wires.

The VMC 224 performs calculations based on the data it receives and determines a flight command for the aircraft 100. For example, the VMC 224 obtains a flight state of the aircraft such as altitude, flight speed, direction, etc., compares the flight state to the flight plan and determines a flight command of the aircraft to change the flight state in order to fly the aircraft 100 according to the flight plan. The VMC 224 then sends the flight command to the actuator control unit 226 in order to implement the flight command at the aircraft 100.

The actuation control unit 226 operates actuator 228 that move the yoke 204 in any desired direction, such as forward/backward, side-to-side, etc., to control pitch and roll of the aircraft 100 as well as pedals 206 to control yaw of the aircraft 100. Each actuation control unit is capable of driving a set of the flight control devices in order to fly the aircraft.

Some or all of the high performance computer 220, first and second EGI 222 and 222a, first and second VMC 224 and 224a, and first and second actuator control units 226 and 226a are supported in the cockpit 124 by a palette or housing 230. The housing 230 provides a rigid support to maintain at least the first and second actuator control units 226 and 226a at a fixed location in front of the instrument panel 208. The housing 230 can include an attachment device that allows the housing 230 to be removably installed in the cockpit 124. The automatic flight control device 200 can be installed prior to flight and removed after flight in order to be installed in another aircraft. In one embodiment, the housing 230 is installed where the co-pilot's seat is usually located. In alternate embodiments, the housing 230 can be installed at the pilot's seat location. The attachment device can be any suitable device, such as a latch, bolt, screw, etc. that is compatible with the support structure of the aircraft 100. The attachment device can accommodate various aircraft designs, thereby allowing the housing 230 to be installed in multiple aircraft. Alternatively, the attachment device can be can be switched out for a specific attachment device that accommodates an aircraft's specific support structure. The housing 230 may be installed or secured at a selected location with respect to the instrument panel 208 or may include an adjustment mechanism that adjusts the location of the actuation control unit 226 with respect to the yoke 204 and pedals 206 once the housing 230 has been installed or secured within the cockpit 124. Due to the adaptability of the housing 230, the automatic flight control device 200 can be installed or retrofitted into various legacy aircraft whether or not the legacy aircraft already has an auto-pilot system installed.

Figure 3:
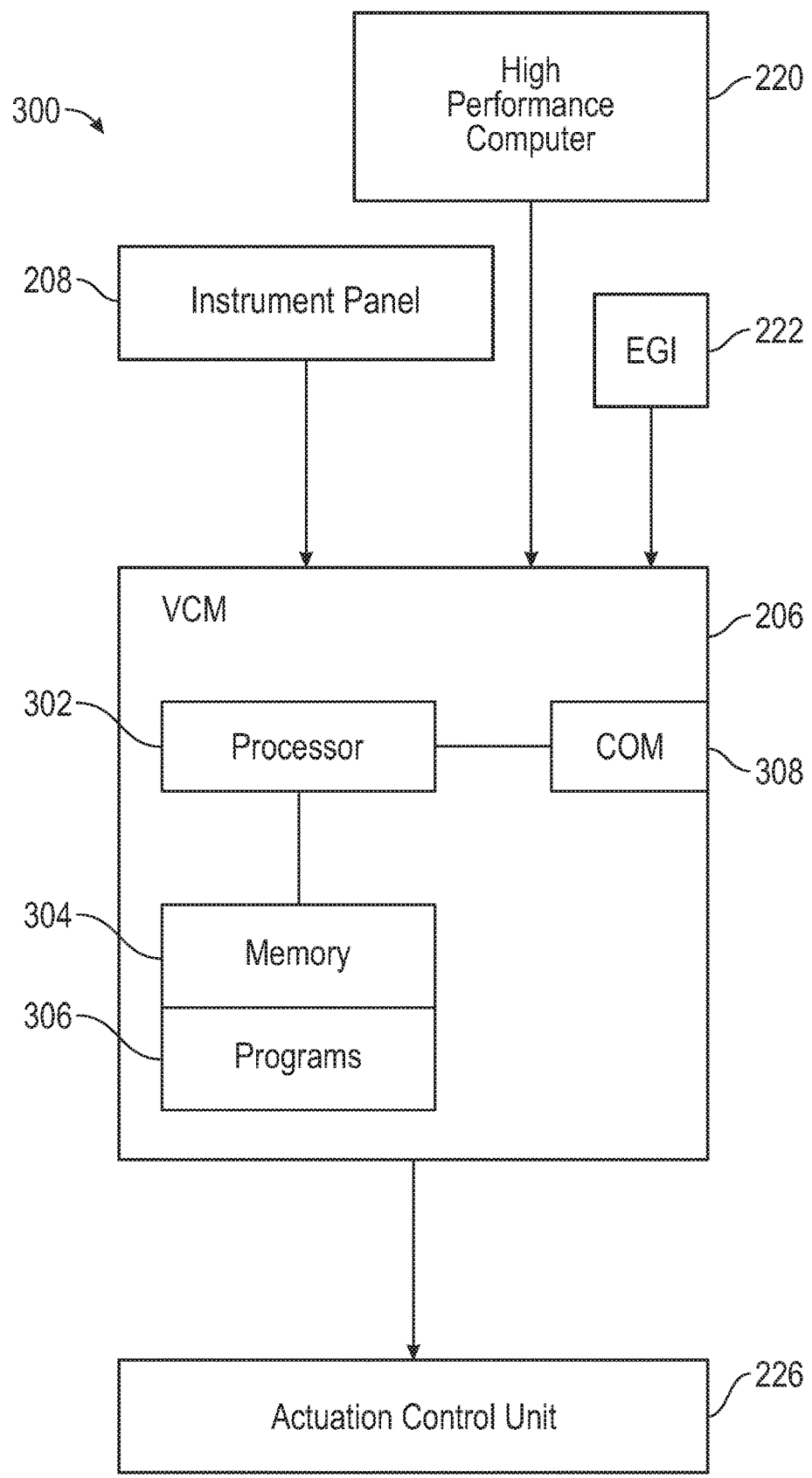
FIG. 3 shows a schematic diagram of the automatic flight control device of FIG. 2.

FIG. 3 shows a schematic diagram 300 of a portion of the automatic flight control device 200 of FIG. 2. First VMC 224 includes a processor 302 for performing various calculations to determine flight adjustments for flying the aircraft 100 according to a flight plan. The processor 302 is in communication with a memory storage device 304 that includes various programs for operating the aircraft 100, such as programs for making flight adjustment to fly according to a flight plan, etc. The processor 302 determines a course of action based measurements from the instrument panel 208, flight plans form the high performance computer 220 and inertial rate and GPS data from the first EGI 222 and decides upon a course of action, such as to change altitude, bank left or bank right, increase flight speed, etc. The processor 302 determines which flight control parameters to change, such as angles of flaps 114, ailerons 116, elevators 118 and rudder 120, etc., and to what degree and operates the first actuator unit 226 to implement the changes to the flight control parameter at the aircraft 100. In one embodiment, first VMC 224 determines a viable range for flying the aircraft and flies the aircraft 100 within the viable range of motion.

The automatic flight control device 200 is able to control flight of the aircraft though an entire envelope of flight procedures, i.e., during take-off, flight and landing. The automatic flight control device 200 can fly the aircraft 100 with or without a pilot on board. Additionally, the programs 306 include generic flight functions and procedures that can be applied to fly different types of aircraft. Therefore, the automatic flight control device 200 can fly a first aircraft, then removed from the first aircraft and installed in a second aircraft in order to fly the second aircraft.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A device for flying an aircraft, comprising:
   a housing that is removably installable in a cockpit of the aircraft; and a processor supported by the housing, the processor configured to
operate a flight control device of the aircraft to control flight of the aircraft through an entire envelope of flight procedures through take-off, flight and landing.

2. The device of claim 1, further comprising an actuator control unit supported by the housing, wherein the actuator control unit operates the flight control device of the aircraft.

3. The device of claim 2, wherein the housing releasably secures to a support structure for a seat within the cockpit to support the actuator control unit at selected location with respect to a flight control device.

4. The device of claim 3, wherein the housing is securable within the cockpit to the support structure for a co pilot seat.

5. The device of claim 1, further comprising a computer for providing a flight plan to the processor.

6. The device of claim 1, further comprising a navigation system that provides at least one of a position and inertial rate of the aircraft to the processor.

7. The device of claim 1, further comprising an interface for receiving flight data at the processor from a flight instrument panel of the aircraft.

8. A method of flying an aircraft, comprising:
installing a removable housing in a cockpit of the aircraft, wherein the housing includes a processor; and
operating the processor to
control flight of the aircraft through an entire envelope of flight procedures through take-off, flight and landing.

9. The method of claim 8, wherein the housing further includes an actuator control unit for operating the flight control device of the aircraft.

10. The method of claim 9, further comprising releasably securing the housing to a support structure for a seat within the cockpit to support the actuator control unit at selected location with respect to a flight control device.

11. The method of claim 10, further comprising releasably securing the housing to the support structure for a co-pilot seat.

12. The method of claim 8, wherein the housing further supports a computer for providing a flight plan to the processor.

13. The method of claim 8, wherein the housing further supports a navigation system.

14. The method of claim 8, further comprising connecting an interface for receiving flight data at the processor from an instrument panel of the aircraft to the processor.

15. The device of claim 1, wherein the processor is further configured to:
receive a flight measurement from the aircraft;
determine a flight control parameter for flying the aircraft from the flight measurement; and
operate the flight control device of the aircraft to implement the flight control parameter to fly the aircraft.

* * * * *